(12) United States Patent
Dowlatabadi

(10) Patent No.: US 7,265,523 B2
(45) Date of Patent: Sep. 4, 2007

(54) CONTROL LOOP FOR SWITCHING POWER CONVERTERS

(75) Inventor: Ahmad B Dowlatabadi, San Jose, CA (US)

(73) Assignee: Aivaka, San Jose, CA (US)

( * ) Notice: Subject to any disclaimer, the term of this patent is extended or adjusted under 35 U.S.C. 154(b) by 0 days.

(21) Appl. No.: 11/257,622

(22) Filed: Oct. 24, 2005

(65) Prior Publication Data

US 2007/0090812 A1   Apr. 26, 2007

(51) Int. Cl.
*G05F 1/00* (2006.01)

(52) U.S. Cl. .................. 323/222; 323/284; 323/286

(58) Field of Classification Search ................ 323/222, 323/282, 284, 286
See application file for complete search history.

(56) References Cited

U.S. PATENT DOCUMENTS

| 6,184,663 B1 * | 2/2001 | Imai et al. .................. 323/274 |
| 7,091,770 B2 * | 8/2006 | Schlaffer .................... 327/541 |

* cited by examiner

*Primary Examiner*—Bao Q. Vu
(74) *Attorney, Agent, or Firm*—James E. Eakin

(57) ABSTRACT

A control loop for a clocked switching power converter where the loop features a comparator (44) and a filter (61) in series to linearize the nonlinear response of the comparator (44). The filter (61) has poles and zeros offsetting the poles and zeros of a bridge rectifier (M1 and M2).

14 Claims, 6 Drawing Sheets

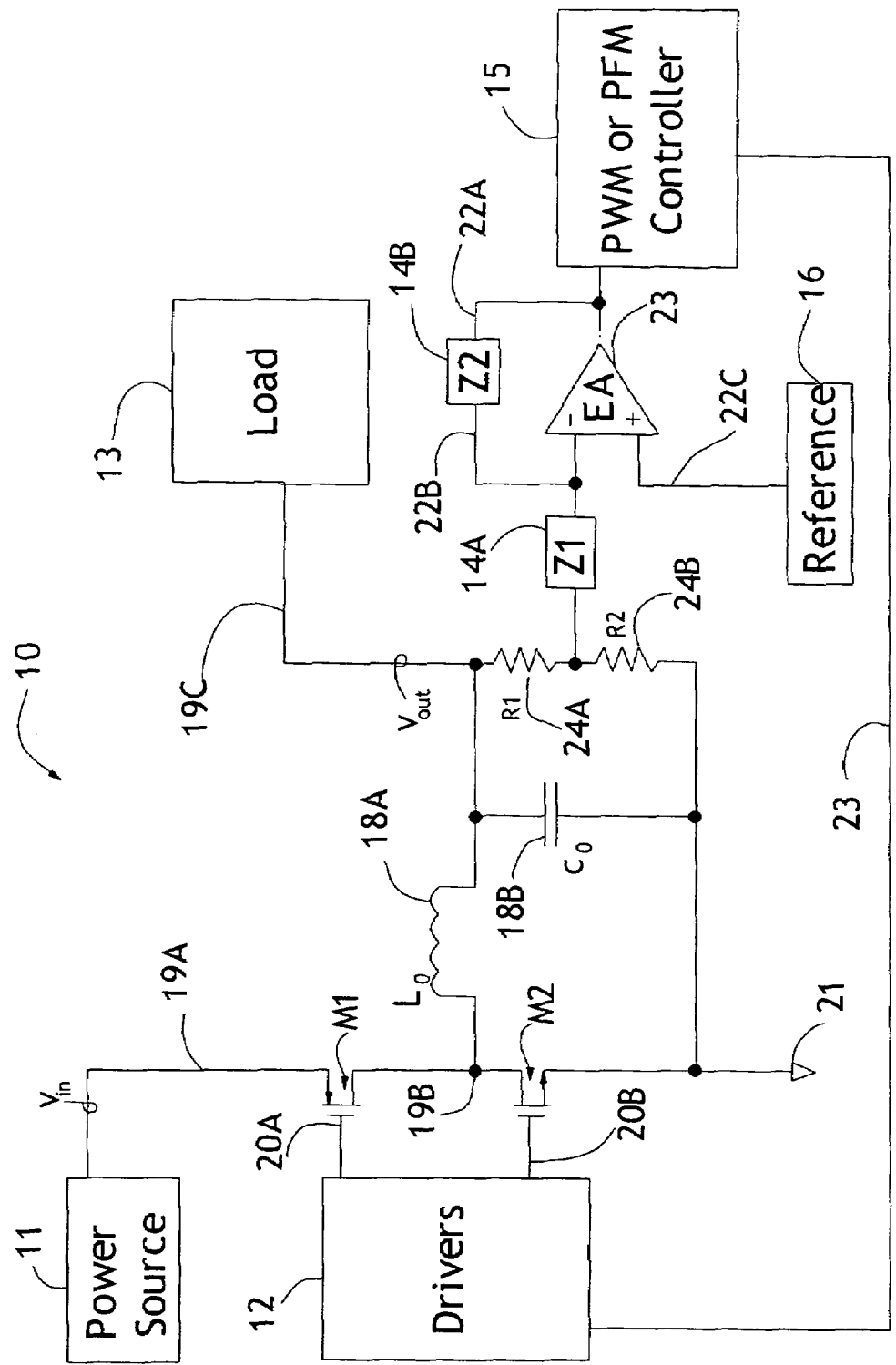
Fig._1 (Prior Art)

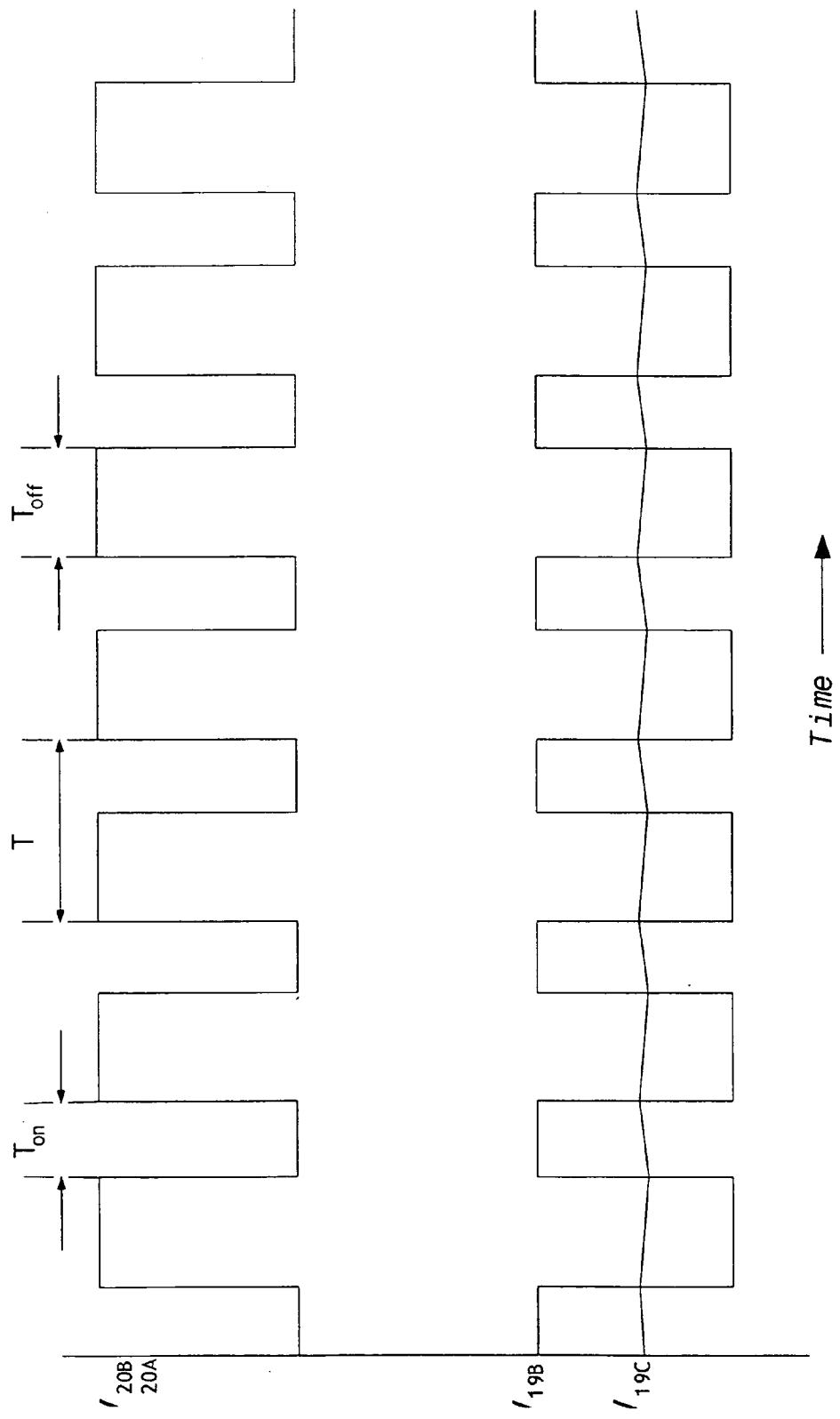
Fig._2 (Prior Art)

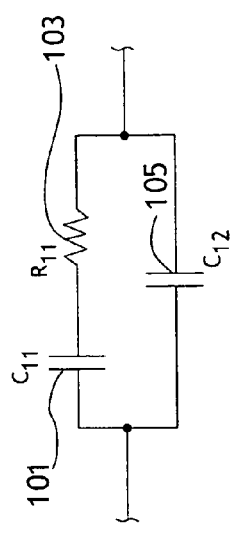
Fig._3 (Prior Art)
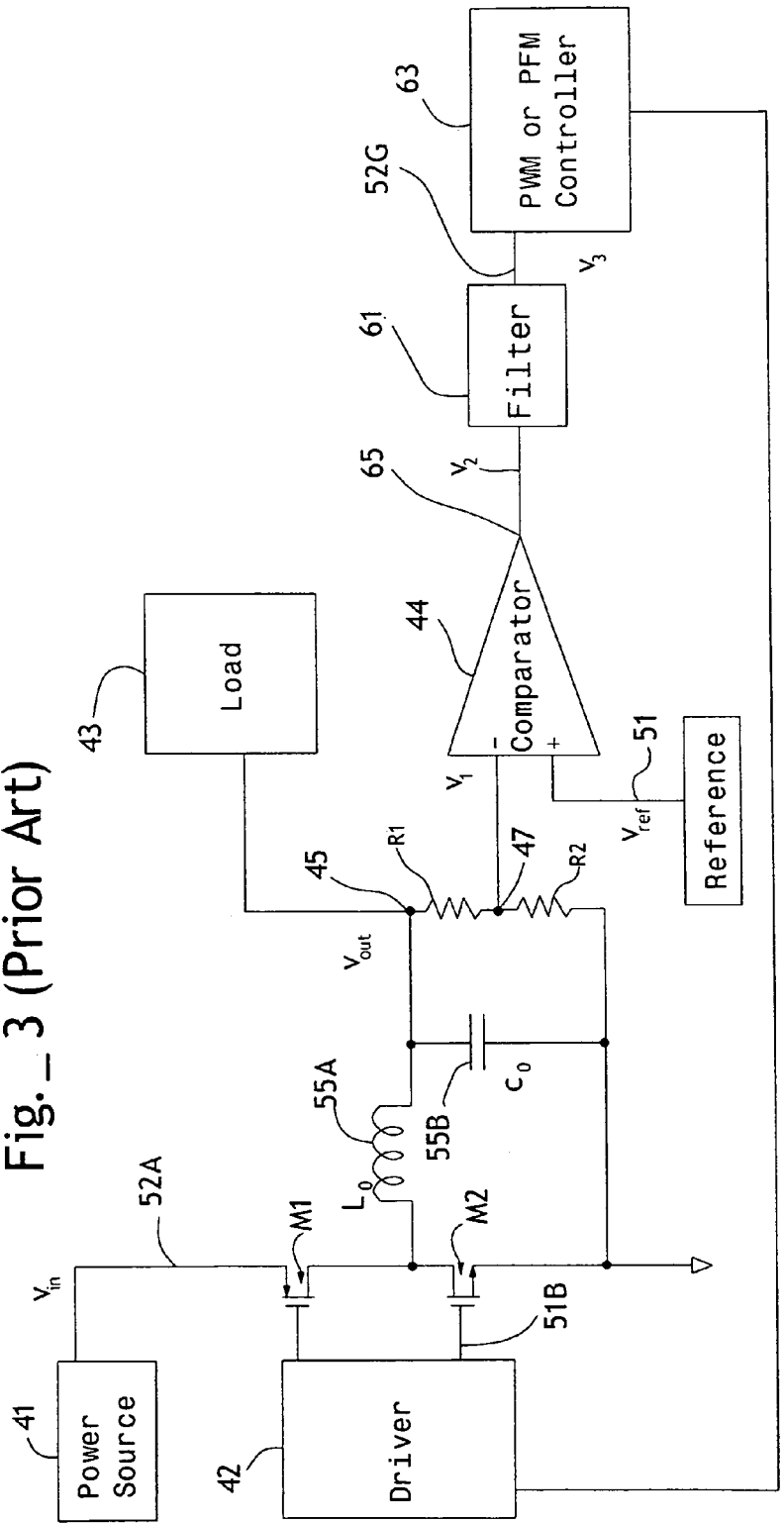
Fig._4

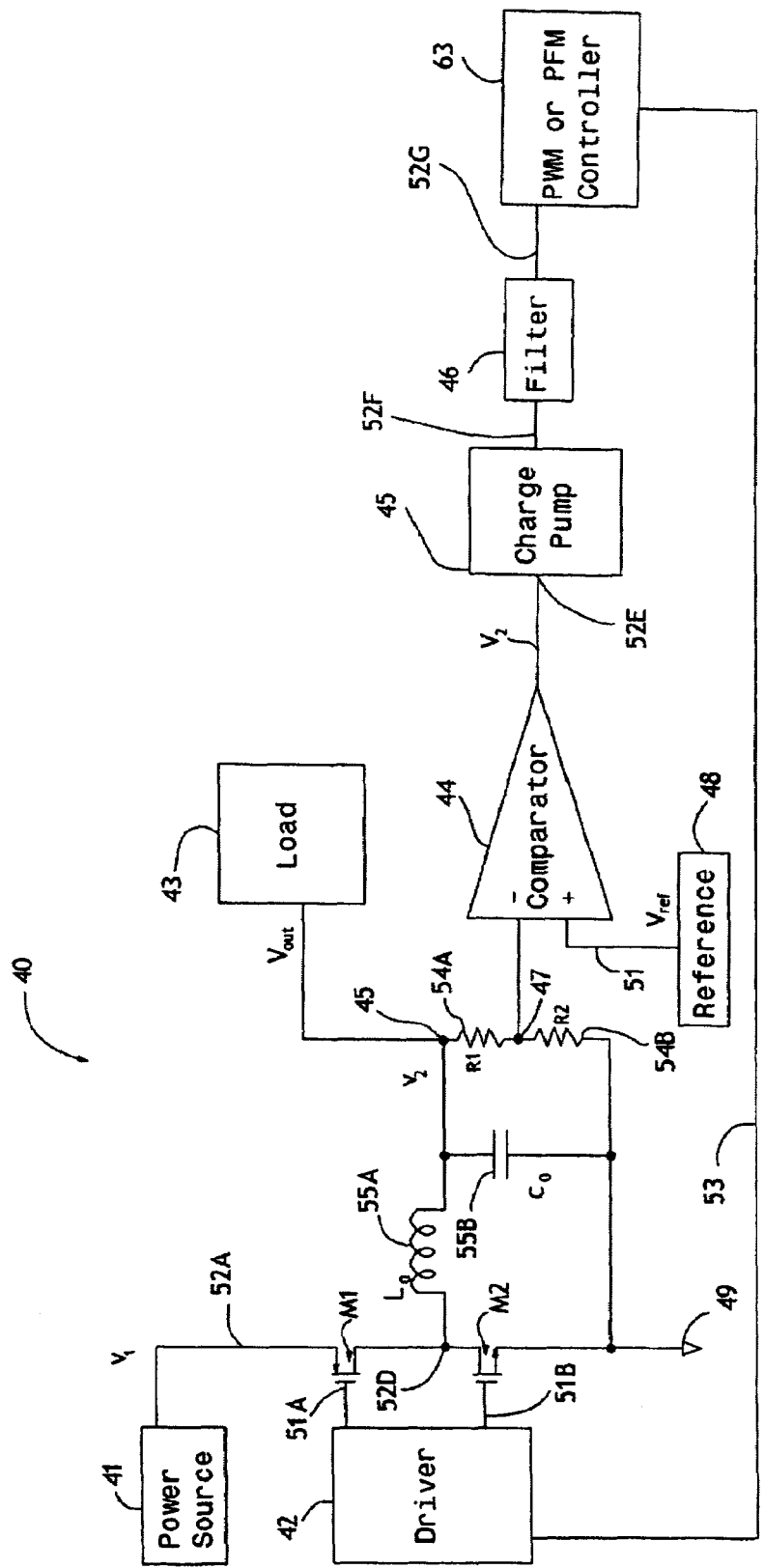
Fig._5

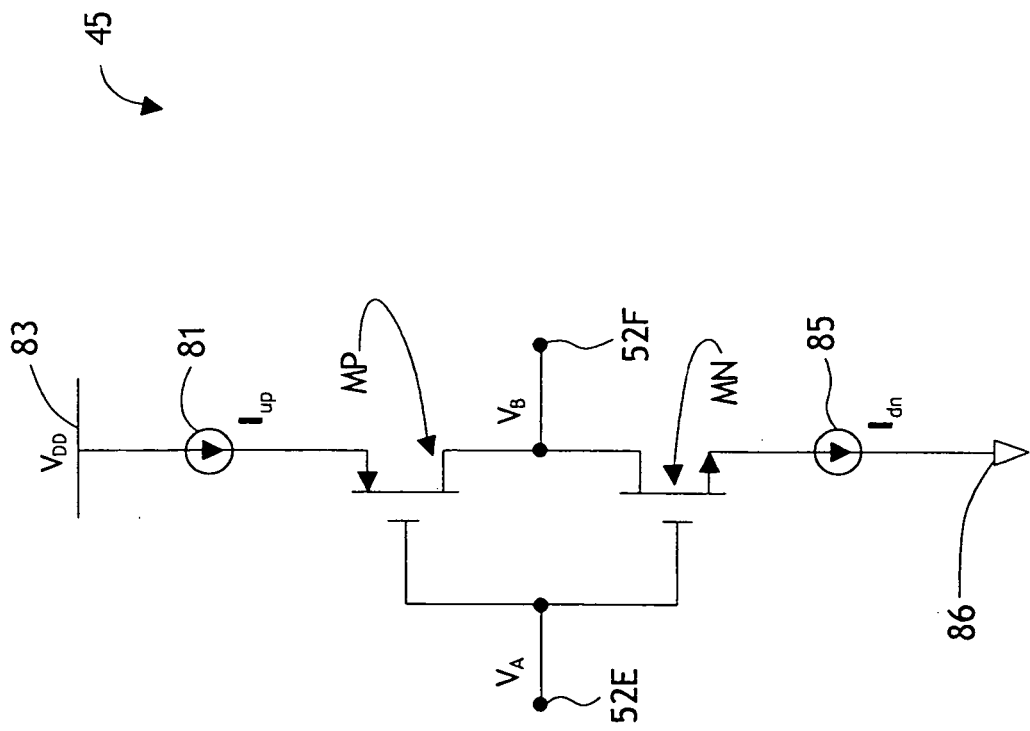
Fig._7
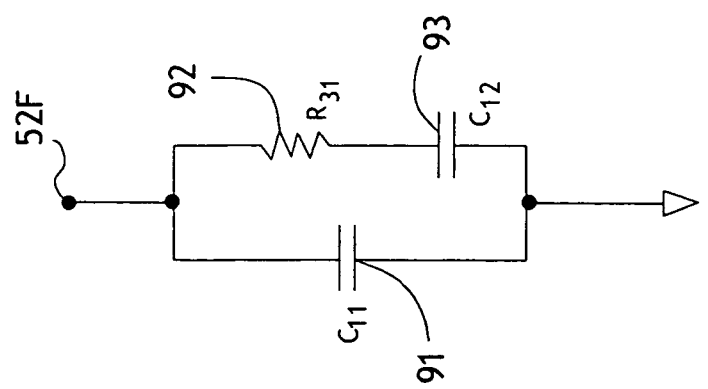
Fig._6

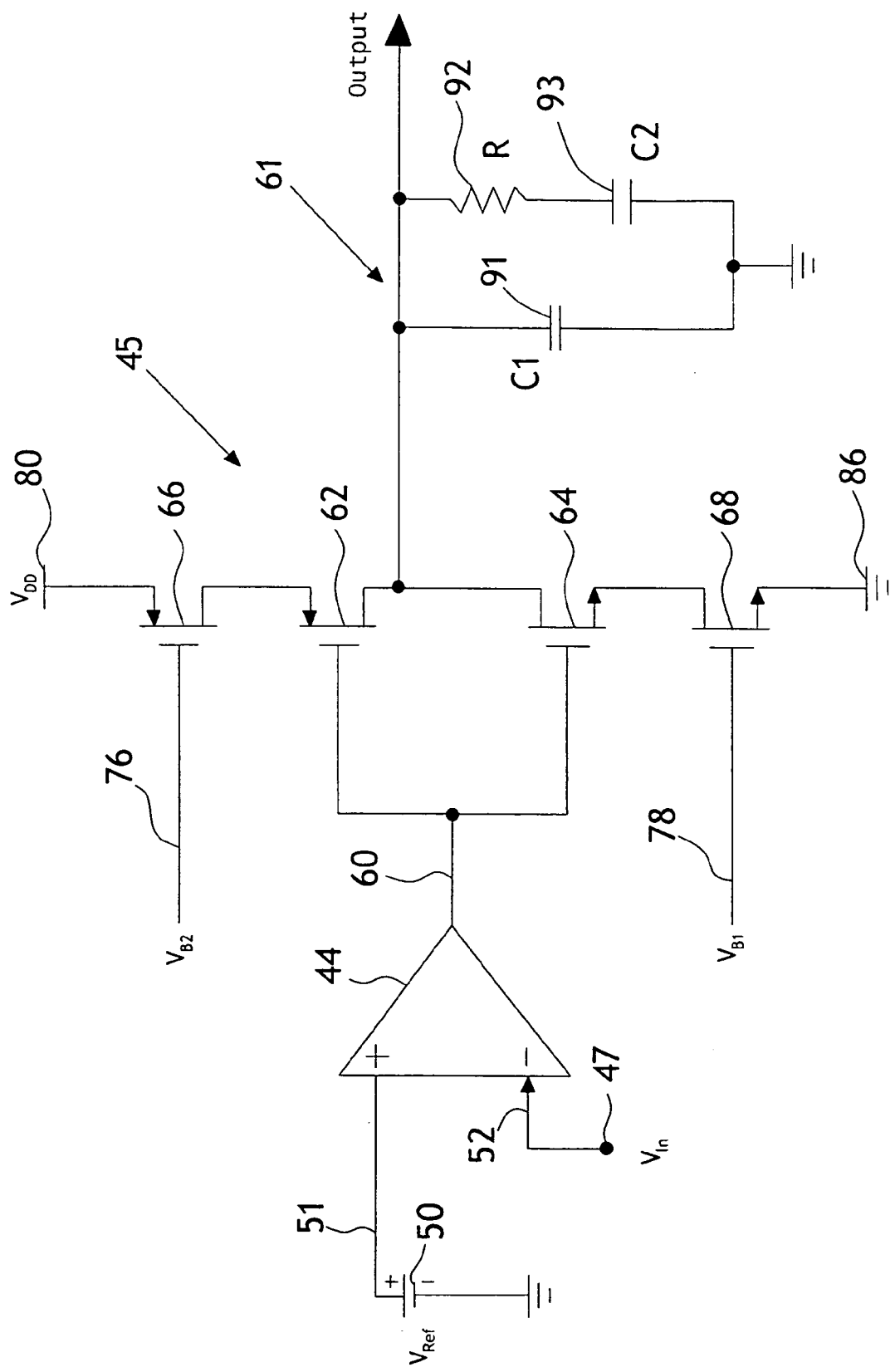
Fig._8

CONTROL LOOP FOR SWITCHING POWER CONVERTERS

FIELD OF INVENTION

This invention relates generally to voltage regulation of switching power converters.

BACKGROUND OF INVENTION

Switching power converters (SPCs) are widely used in electronic systems to convert a direct current (DC) voltage into a different DC voltage, or an alternating current (AC) voltage into a DC voltage, or a DC voltage into an AC voltage. SPCs are widely used in both portable and non-portable applications for a wide range of power and voltage ranges. There are numerous architectures for each application such as buck (step down), boost (step up), H-bridge, and fly back. Yet, regardless of the type of converter, they all need a controller so that a regulated and well maintained voltage at the output is created. The generated output voltage is often used as a power supply to an specific load within the electronic system. There could be different types of SPCs in one system, each with its own particular load and controller and its particular set of specifications.

FIG. 1 shows block diagram of a typical prior art step-down (or buck) DC/DC switching power converter (SPC) that converts a DC voltage with value of $V_{in}$ from a power source 11, such as an AC to DC full wave bridge rectifier or batteries, into a lowered DC voltage with value of $V_{out}$ (where $V_{out} < V_{in}$). A prior art power converter might convert $V_{in}$ to a DC output voltage, $V_{out}$, of 2 volts DC. The core of a buck SPC is made of two transistor switches; M1 and M2, along with inductor 18A, having a value $L_0$, and capacitor 18B, having a value $C_0$. Transistor M1 can be either a p-channel or a n-channel device, while M2 is customarily a n-channel device. The type selection for M1 and M2, between n-channel or p-channel, is heavily dependent on design requirements and availability of devices within the system.

FIG. 2 shows a timing diagram of voltages at nodes 19B, 19C ($V_{out}$) 20A and 20B during a steady state condition of the SPC of FIG. 1. By opening and closing transistor switches M1 and M2 in a complementary fashion, at a rate set by a clock oscillator associated with controller 15 in FIG. 1, where only one device is on at any given moment, the voltage at node 19B would be a signal with the same frequency as the signal at node 20A or 20B. The magnitude of the voltage at node 19B alternates between zero and $V_{in}$. This alternating voltage would be filtered by inductor 18A and capacitor 18B at node 19C to an approximate value of $$V_{out} = V_{in}(T_{on}/T) \tag{1}$$

where $T_{on}$ is the duration for which M1 is kept conducting (in this case while signal at node 20A is at zero), and T is the total period of signal at node 20A (or period of signal at node 20B). Referring to FIG. 2, the ratio of $T_{on}/T$ is called the "duty cycle" of the clock. So, for a 20 percent "duty cycle", the output voltage $V_{out}$ would be $V_{out}=0.2V_{in}$ assuming no losses.

Returning to FIG. 1, a regulation loop for a prior art SPC is often made of an error amplifier (EA) 23, having an input element Z1, represented by block 14A, and a feedback element Z2, represented by block 14B, a pulse width modulator (PWM) or a pulse frequency modulator (PFM) controller 15, and a driver 12 to turn M1 and M2 on and off. The error amplifier may be an analog or digital device which evaluates a sample of power ripple on one input to the error amplifier versus a reference-voltage on node 22C from a reference supply 16. This regulation configuration is frequently seen in buck, boost, and fly-back switching power converter designed of the prior art. An entire SPC system can be built on a printed circuit board using discrete components or it can be built as an integrated circuit using CMOS, BiCMOS, BCD, or any other process technology suitable for such a design.

Referring again to FIG. 2, if value of T is held constant for a constant clock period, or frequency, and $T_{on}$ (or $T_{off}$) is varied to control voltage at node 19C ($V_{out}$), then the controller is called a PWM or pulse width modulator controller. Yet, if T is varied and $T_{on}$ (or $T_{off}$) is held constant, then the controller is a PFM or pulse frequency modulator controller. In either case, PWM or PFM, transistor switches M1 and M2 are operated in a manner that creates a voltage pulse at node 19B. Inductor 18A, having a value $L_0$, and capacitor 18B, having a value $C_0$, are connected in a manner to form a low-pass filter so that pulse signal at node 19B is converted into a fairly constant DC voltage at 19C defined by Equation 1 and depicted in FIG. 2. Voltage at node 19C is used to power up any possible load, such as load 13.

Using small-signal analysis, the low-pass filter created by inductor 18A and capacitor 18B produces two poles at $f_{P1}$ and $f_{P2}$ that can be calculated from $$f_{P1} = f_{P2} = \frac{1}{2\pi\sqrt{L_0 C_0}} \tag{2}$$

Now, since there are two poles within the regulation loop, this system would be unstable in a closed loop configuration if there is no change made to the loop. So, the loop must be compensated.

Referring again to FIG. 1, error amplifier 23 along with two elements 14A and 14B, with values Z1 and Z2, respectively, serve as the main compensation circuitry to add stability to the loop. This is a very commonly practiced scheme to compensate a SPC regulator loop. Using small-signal analysis, in the frequency domain, the voltage gain of error amplifier 23 combined with elements Z1 and Z2 can be calculated as $$A_1 = \frac{-Z2}{Z1} \tag{3}$$

By using a proper combination of active and passive components, primarily capacitors and resistors for Z1 and Z2, proper additional poles and zeros can be added within the regulation loop in order to stabilize it.

FIG. 3 shows one possible method of implementing a complex value for Z2 with a capacitor 101, having a value $C_{11}$, in series with a resistor 103, having a value $R_{11}$, both the capacitor 101 and resistor 103 in parallel with capacitor 105, having a value of $C_{12}$. So, assuming a simple resistor is used for Z1 with value of $R_{Z1}$, and assuming Z2 is set to be a combination of one resistor and capacitors shown in FIG. 3, then $A_1$ (in Equation 3) is $$A_1 = -\frac{1 + sR_{11}C_{11}}{R_{Z1}s[sR_{11}C_{11}C_{12} + (C_{12} + C_{11})]} \quad (4)$$

with one zero at $1/(2\pi R_{11}C_{11})$, and two poles. However, it must be noted that the DC voltage gain of error amplifier 23 is simply equal to its open loop voltage gain, and is not calculated from Equation 4. Furthermore, capacitor 18B, in FIG. 1, having value $C_0$, has series parasitic resistance, not shown in FIG. 1, with a value of $R_{ser}$ which would add another zero at $1/(2\pi C_0 R_{ser})$. There are effectively two poles created by $L_0$ and $C_0$ (at $f_{P1}$ and $f_{P2}$), and two additional poles created by Z1 and Z2 which yield a number of poles totaling four, with two zeros within the loop. Hence, by adjusting the values of passive components $L_0$, $C_0$, (both associated with the bridge converter), $C_{11}$, $C_{12}$, $R_{11}$, (the latter three values seen to be associated with the components of FIG. 3), and $R_{Z1}$, (the resistance value of the impedance Z1 in block 14A of FIG. 1) a regulation loop can be compensated to ensure a stable operation for all conditions.

The same analysis can be used for any other converter such as a fly back, boost or buck-boost, or H-bridge which uses this common type of regulation. One of the main problems in a regulation loop is the error amplifier itself. The error amplifier must have a high voltage gain, and adequate bandwidth in order to be effective. If the voltage gain or speed of the error amplifier is compromised for any reason, then additional error terms are introduced, which in turn may not produce a stable controller. So, performance of the error amplifier is a very crucial and important issue that must be considered for any regulator.

Power supply of an amplifier plays a very crucial role in its gain and bandwidth. A reduced power supply voltage often lowers either the gain or speed, or both gain and speed. Traditionally, error amplifiers in a regulation loop need a minimum power supply voltage of around 2V to operate properly. Furthermore, in a typical buck SPC the entire regulation loop may be powered by the provided power source, which has a value of $V_{in}$. Thus, the minimum voltage for power source or ($V_{in}$) is often limited to around 2V for a conventional buck SPC. So, if the value of $V_{in}$ drops below this critical limit of around 2V, then the error amplifier that is used in the buck SPC regulation loop could have a reduced voltage gain or bandwidth, which could hinder the performance of the entire converter, or may prevent operation of the converter.

In a boost converter, where $V_{in}$ is increased to a larger value at the output and $V_{out} > V_{in}$, if $V_{in}$ is less than a critical voltage which is needed to run all of the internal circuitry, such as the error amplifier or reference circuitry, then the output voltage $V_{out}$ may not be regulated until its value reaches a specific value high enough that can be used as the power source to the regulator itself. Then, the loop is activated to regulate the value of $V_{out}$ at its targeted value.

Thus, general use of an architecture similar to that shown in FIG. 1 in buck SPCs is limited mainly to system where $V_{in}$ is, at a minimum, around 2V. Nevertheless, there are applications where a buck SPC is needed to convert a lower voltage power source, such as household batteries that are used as a main power source. In this case $V_{in}$ could be as low as 1.3V. A desired output voltage ($V_{out}$) could be anything from 1.2V to as low as 0.4V.

In such systems, one available scheme could be simply to use a linear voltage regulator. However, the efficiency of linear voltage regulators is approximated by $$\eta = V_{out}/V_{in} \quad (5)$$

where $V_{in}$ and $V_{out}$ are their respective input an output voltages. Thus, linear regulators are considered very inefficient for large voltage drops and may not be suitable for a system where $V_{in}$=1.3V and $V_{out}$=0.65V, since $\eta$=50%. An SPC efficiency could be as high as 95% for similar voltage drop ratios. Another available method could be to employ a boost SPC to increase the provided power source by stepping up a value of $V_{in}$ as previously mentioned to voltage of around 2V, or higher, and then use a buck SPC to regulate the created 2V level back to a voltage lower than the initial $V_{in}$. Such an approach would need two sets of SPCs which increases the cost and would reduce the entire efficiency of the power converter circuitry. This may not be acceptable, yet it could be the only effective "efficient" solution.

Other approaches to regulate a SPC involve using a digital architecture. The goal is to "dynamically" adjust $V_{out}$ in order to optimize the power consumption of the load. Hence, these approaches are not used to keep $V_{out}$ at a constant value, but to change it according to the need of a specific digital load in order to minimize the amount of power consumed within such load, such as a micro-controller or microprocessor circuits. In another embodiment, the efficiency of switching power converters for low power applications was addressed where an analog-to-digital converter (ADC) has been used to sample the output voltage $V_{out}$ and voltage regulation was done through digital circuits. An analog-to-digital converter (ADC) has been used to sample the output voltage, $V_{out}$, and voltage regulation was done through digital circuits. However, the input voltage was typically kept to a value around 3V to keep an analog-to-digital converter operational.

An object of the invention is to create a new control loop to regulate the output voltage of switching power converters (SPCs), even at low input power supply voltages, particularly lower than 2V, in order to: reduce design complexity, reduce control circuitry power consumption, and facilitate design portability of the regulator between different process technologies (i.e. CMOS, BiCMOS and such).

SUMMARY OF THE INVENTION

The above objectives have been realized with a control loop for a SPC to provide rectified DC to a loop having a simple voltage comparator instead of a traditional operational amplifier, along with a simple filter to linearize the nonlinear response of the comparator. The filter has poles and zeros to promote stability in the loop. The new technique can tolerate process, temperature and voltage variations, and is capable of operating with low power supply voltage (less than two volts) with no degradation in performance. The circuit can easily be ported into different process technologies without major design modifications. The circuit can be applied to any SPC circuit including DC-DC, DC-AC and AC-DC converters. By using this new regulation technique the power supply voltage applied into the SPC control loop can easily be lowered without harming regulated $V_{out}$.

BRIEF DESCRIPTION OF THE DRAWINGS

FIG. 1 is a circuit diagram of a buck type of switching power converter of the prior art.

FIG. 2 is a timing diagram of voltage versus time at various nodes in the circuit of FIG. 1.

FIG. 3 is a circuit diagram of a complex impedance load for an error amplifier of the prior art.

FIG. 4 is a circuit diagram of a control loop for switching power converter in accordance with the present invention.

FIG. 5 is a circuit diagram of an alternate control loop, with a charge pump, following FIG. 4.

FIG. 6 is a circuit diagram of a typical filter for use in the control loop of FIGS. 4 or 5.

FIG. 7 is a circuit diagram of a charge-pump joined to the circuit of FIG. 6 at node 52F.

FIG. 8 is a circuit diagram of principal regulation components shown in the control loop illustrated in FIG. 5.

DETAILED DESCRIPTION OF THE PREFERRED EMBODIMENT

With reference to FIG. 4, the present invention came about with the realization that the function of the linear error amplifier 23 in FIG. 1 and the compensation elements Z1 and Z2 can be replaced with a simple high gain detection circuit with a non-linear response, and a proper filter to create a pseudo linear behavior to regulate the loop. At very low frequencies near DC, the error amplifier behaves like a simple voltage comparator with a very large voltage gain. Yet, it is only at higher frequencies that it can assist in compensating the loop. So, the same behavior can be implemented with components that may not suffer from shortcomings of typical error amplifiers. A non-linear detection circuitry such as a voltage comparator is typically more robust to variations in headroom voltage, temperature, and process variations. Of course, a current comparator can be configured to be equivalent to a voltage comparator. Hence, its adaptability to these changes can be used to make the entire compensation loop more robust.

A high gain voltage comparator 44 is used to detect an error involving output voltage ($V_{out}$) at node 45 or a fraction of it, at node 47 after a portion of the output voltage at node 45 is dropped across resistors R1 and R2. This voltage $V_1$ is a first input to comparator 44. A second input is a reference voltage on line 51. Assuming that the voltage comparator has a sensitivity of $\in$ (where $\in \cong 0$) and has very small propagation delay, then if $V_1$ is greater than $V_{ref}$, then the comparator output, $V_2$, is at logic level 0, and when voltage $V_1$ is less than $V_{ref}$, the comparator output, $V_2$, is at $V_{in}$, logic level 1. So, $V_2$ can be viewed as a pulse voltage modulating from a positive voltage to zero or a negative voltage (if the comparator is powered by two separate power supplies, one positive and one negative). The amplitude of this pulse can be a few volts in magnitude. If the comparator is solely powered with a single power source such as $V_{in}$, then the pulse would merely vary from zero to $V_{in}$. By placing a simple low-pass filter in the path of the comparator, the pulse voltage at the comparator output node 65, $V_2$, can be averaged to create a fairly constant voltage which can be fed into the PWM or PFM controller 63 to eventually regulate the loop. Conceptually, the comparator 44 and filter 61 would effectively replace the error amplifier 23 and Z1 and Z2 in FIG. 1. The primary goal is to create a constant voltage at the input of PWM or PFM controller 63 so the loop is stabilized. However, the same issues related to the poles and zeros in the regulation loop still exist and must be considered. The filter block inside FIG. 4 can be built to have the following response:

$$H(s) = \frac{1 + s/\omega_{z1}}{(1 + s/\omega_{p1})(1 + s/\omega_{p2})} \quad (6)$$

where $H_{(s)}$ is the transfer function of the filter, s is a complex variable and ω is a frequency term ($\omega_{z1}$ being a frequency term associated with the zero of the transfer function and $\omega_{p1}$ and $\omega_{p2}$ being frequency terms associated with pole one and pole two, respectively). The inverse Laplace transform of H(s), $L^{-1}[H(s)]$ yields expressions that characterize the behavior of the filter in the time domain. Equation 6 is similar to Equation 4 and it is the simplest form of such filter, with one zero and two poles. One such filter network could be similar to the circuit shown in FIG. 3, with one end connected to ground. One main issue of implementing the filter is the magnitude of $V_2$, the voltage of comparator output node 65. Since the magnitude of $V_2$ is modulated from zero to $V_{in}$, it can cause a challenge in design. If a battery is used as the power source for the power converter, then its output voltage will normally change as charge is depleted. So, even though implementing a filter with a variable $V_{in}$ is possible, it still can be a difficult design task from practical points of view.

A simpler approach is to insert a simple charge-pump circuit 45 in FIG. 5 that can add (or remove) a constant amount of charge into or out of a node, depending of magnitude of $V_2$, the voltage on node 52E at the output of comparator 44. Then, in accordance with the invention, a stabilized regulation loop includes a comparator, a charge-pump, and a filter to deal with that near constant yet modulating charge instead of dealing with a pulse-like voltage, $V_2$. A charge-pump is commonly used in the design of traditional phase locked loops (PLLs) where the phase or frequency of a reference clock is compared to the phase or frequency of the generated clock signal out of a voltage controlled oscillator (VCO). Accordingly, charge is added or subtracted from a node by the charge-pump. Note that this type of "charge pump" is different from other types of charge pumps used to increase voltage from a low value to a high value using a series of phased switches controlling charge transfer from connected capacitors. The present invention employs charge adding and subtracting charge pumps, not the other type of charge pump. So, this particular approach with some simple modifications can easily be applied here in SPC regulation design.

Referring to FIG. 5, power source 41 may be a full wave bridge converting an AC voltage to some DC level. This DC level is being regulated by a buck SPC which is made of two transistor switches M1 and M2. M1 is shown as a p-channel device and M2 is shown as a n-channel device for this example, yet both can be n-channel devices if needed with some possible extra circuitry to drive M2.

Transistors M1 and M2 are connected to inductor 55A, having a value $L_0$, and capacitor 55B, having a value $C_0$. The input voltage at node 52A, with value of $V_{in}$, is reduced to a lower voltage at node 45, with value of $V_{out}$ that can be connected to a possible load, in this case load 43. The value of $V_{out}$ is regulated by a loop that is made of components that can either be built on a printed circuit board or in an integrated form in CMOS, BiCMOS, or bipolar technologies (or any other technology suitable for such a design such as silicon carbide, silicon-on-insulator, silicon germanium, and bipolar-CMOS-DMOS).

A network is used to provide a voltage at the negative input of comparator 44 which is directly proportional to $V_{out}$ and will be compared to a reference voltage $V_{ref}$ at node 51. In this case, two series connected resistors 54A and 54B, with respective values R1 and R2, are used to create the proportional voltage at node 47. The voltage at node 47 and the reference voltage provided by reference voltage supply 48 at node 51 from reference supply 48 are compared to each other by voltage comparator 44. Voltage comparator 44 compares these two voltages at nodes 47 and 51 and provides a signal at its output at node 52E. If voltage at node 47 ($V_{47}$) is larger than voltage at node 51 ($V_{ref}$) then voltage at node 52E ($V_2$) is set to a logic zero. However, if $V_{47}$ is less than $V_{ref}$, then $V_2$ is set to a logic 1. The comparator is connected to a charge-pump which can add charge to or remove charge from node 52F.

The circuit diagram shown in FIG. 7 illustrates an exemplary charge-pump. If the comparator 44 output voltage at node 52E is at a logic zero, then current $I_{up}$ generated by charge-pump 45 flows into node 52F. Assuming capacitor 93 in the filter of FIG. 6, having value $C_{12}$, is much larger than capacitor 91, having value $C_{11}$, then the voltage variation at the output node 52F (in FIG. 5) of charge-pump 45 for $V_{52E}$="0" would be $$\Delta V_{52F} = (I_{up}T_{up})/C_{12} \quad (7)$$

where $I_{up}$ is the value of the current source in charge-pump 45 and $T_{up}$ is the duration for which $I_{up}$ is flowing into node 52F. When the output of comparator 44 is a logic one, i.e. $V_{52E}$="1", then capacitor $C_{12}$ will be discharged by an amount calculated by $$\Delta V_{52F} = (I_{dn}T_{dn})/C_{12} \quad (8)$$

Similarly, $I_{dn}$ and $T_{dn}$ are the respective values of current and the duration for charge-pump 45 in which $I_{dn}$ is flowing from $C_{12}$. It must be noted that in the frequency domain, a single capacitor adds another pole to the regulation loop which causes an additional reason for the entire system to be unstable and is not recommended for this system without stabilization circuitry. Filter 46 must be able to smooth the voltage at node 52F, and to compensate the loop and to prevent oscillation.

By using frequency domain analysis, a zero is added at $$f_{Z1} = \frac{1}{2\pi R_{31} C_{12}} \quad (9)$$

where $f_{Z1}$ is the frequency of the zero. Two poles are added: a single pole at zero ($f_{P3} = 0$) and another pole at $$f_{P4} = \frac{C_{11} + C_{12}}{2\pi R_{31} C_{11} C_{12}} \quad (10)$$

where $f_{P4}$ is the frequency of the added pole. Thus, by selecting proper values for $R_{31}$, $C_{11}$, and $C_{12}$ values of the created pole and zero can be placed such that an stable system is obtained. Furthermore, parasitic resistance of the capacitor 55B, having value $C_0$, would add an extra zero within the network that would be used in stabilizing the system, along with the values of $C_{11}$, $C_{12}$, and $R_{31}$)

Values of $I_{dn}$ and $I_{up}$ would contribute to the overall gain of regulation loop. By increasing their values, overall gain is increased and the locations of poles and zeros must be modified in response to those changes. Consequently, all of these parameters become design criteria and must be considered for any system.

A voltage comparator is inherently a non-linear circuit, unlike an error amplifier. However, an error amplifier that operates in an open loop mode can be used like a voltage comparator within this system, without any noticeable problem. Alternatively, an error amplifier with a very small amount of feedback can still operate as a voltage comparator within this system. A current comparator can also be used. So, voltage comparator 44 can be of any manner and design, as long as it can perform the voltage detection needed in this system, as described above.

Filter 46 is used to smooth the voltage created at node 52F, the charge-pump output, and apply it to a controller block. Voltage at node 52G out of filter 46 is applied to PWM or PFM controller 63 which provides the needed signals through data line 53 to driver 42. The controller controls the duty cycle for transistor switches M1 and M2.

FIG. 7 shows a simplified operational diagram of a well known charge pump used in FIG. 5 having a characteristic design primarily used in phased lock loop (PLL) and delay locked loop (DLL) systems. Any circuit that can perform the function of injecting and retracting current or charge could be used as the charge-pump 45 in FIG. 5.

Returning to FIG. 7, in operation, charge-pump 45 has an input node 52E having a voltage, $V_A$, from the comparator 44 in FIG. 5. This voltage is either a logic one or a logic zero ($V_A$ is either at $V_{in}$ or zero volts). When $V_A$ is at logic one, when $V_A$=$V_{in}$, then transistor MN is conducting and transistor MP is off. Hence, current $I_{dn}$ flows from node 52F and pulls the voltage at node 52F toward the voltage at node 86, in this case ground. Alternatively, when $V_A$ is at logic zero, then transistor MN is shut off and MP is on. Hence, current $I_{up}$ flows out of node 83 and voltage at node 52F is pulled toward the voltage at node 83, in this case $V_{DD}$.

Variations on the charge-pump construction are many. Filter 46 in FIG. 5 is of the type commonly used in the design of PLL systems. FIG. 6 shows the simplest circuit that can be used for the filter, with a capacitor 91 in one branch in parallel with a second branch having resistor 92 in series with capacitor 93. However, there are many variations on this filter and other filters can provide the needed poles and zeros and smooth out the voltage at node 52F by providing an additional zero in the stabilization loop to stabilize the entire regulation loop. The filter can be higher than a second order filter. It can have more than two poles and more zeros. It can be any filter that stabilizes the control loop. Many different filters can be designed, sometimes with software adapted to the purpose.

Controller 63 in FIG. 5 can be either a PFM or PWM modulator. Driver 42 in FIG. 5 amplifies pulses that can have either fixed frequency and variable width (PWM), or fixed pulse width and variable frequency (PFM) established by controller 63. The controller 63 adjusts the pulse width for a PWM or pulse frequency for a PFM. Reference voltage 48 sets a target voltage. Resistors R1 and R2 reduce voltage $V_{out}$ at node 45 for comparison with $V_{ref}$. The controller 63 makes adjustments to driver 42 to minimize the ripple in $V_{out}$ at node 45 and into load 43. The invention would work with either PWM or PFM for a buck (step-down), boost (step-up) or buck-boost switching power converters and regulators. The present invention provides a stabilized regulation loop for a SPC with a non-linear voltage comparator, a charge-pump of the type commonly used in PLL circuitry, and a low pass filter with the combination having poles and zeros offsetting the poles and zeros of the bridge rectifier. Blocks that are typically used in the regulation loop shown in system 40 such as voltage comparator 44, charge-pump 45, filter 46 and PWM or PFM controller 63 and driver 42 are common circuitry.

In general, system 40 may be built on PC board from discrete components, or in an integrated circuit form in any technology suitable for such a system, such as but not limited to CMOS, BiCMOS, GaAs, Bipolar (or BJT), SiGe, Silicon on Insulator (SOI), or any other integrated circuit process capable of producing system 40 in an integrated form. Or, entire system 40 can be built as a combination of discrete components and integrated circuits built in different process technologies that are proper for such a system.

With reference to FIG. 8, comparator 44 has a voltage signal input 52 from terminal 47 where terminal 47 is an output node of a bridge converter, such as a half-bridge, as seen in FIG. 5. Comparator 44 also has a reference voltage input on line 51 associated with a voltage reference source, such as battery 50. Comparator 44 is made of a plurality of CMOS transistors of the type shown and described in U.S. Pat. No. 6,198,312.

The output of comparator 44 on line 60 feeds charge pump 45, similar to the charge pump shown in FIG. 7. The charge pump features a pair of CMOS transistor switches 62 and 64. Transistor 62 is a p-channel device connected to a p-channel current sourcing transistor 66 biased by a reference voltage on gate line 76 to provide a supply voltage 80 and current when the gate of switch 62 is biased negative. The provided current flows toward filter 61 and specifically into capacitors 91 and 93. Transistor 64 is an n-channel device connected to an n-channel current sinking transistor 68 biased by a reference voltage on a gate line 78 to provide access to ground 86 for sinking current when the gate of switch 64 is biased positive by the output of comparator 44. In this case, current is drawn from filter 61. The filter 61 is shown to be the same as the filter of FIG. 6. This filter is a typical simple filter and equivalent filters, more or less sophisticated, analog or digital, may be used.

The invention claimed is:

1. A regulation loop for a switching power converter of the type having a pulse width variable or pulse frequency variable modulator operating switches associated with a power source and a bridge filter section, with a power output node feeding a load, the variable parameter of the modulator establishing an amount of regulation and efficiency of the power converter, the improvement comprising:
   a comparator having a high impedance first input sampling a voltage or current from the power output node of the switching power converter as a first input signal and having a second input signal from a reference supply representing a target voltage or current level for the load, the comparator having an output signal on an output line with a high or low signal depending on whether first input signal exceeds the second input signal or not;
   a charge pump connected to receive the output signal from the comparator and either source or sink current in response thereto as a current signal; and
   a filter connected to the comparator receiving the current signal and delivering a filter output signal operating a pulse width variable or pulse frequency variable modulator.

2. The apparatus of claim 1 wherein the filter comprises at least one capacitor in communication with the charge pump, whereby the charge pump adds and subtracts charge from the capacitor.

3. The apparatus of claim 1 wherein the filter comprises at least two capacitors in communication with the charge pump, whereby the charge pump adds and subtracts charge from the capacitor.

4. The apparatus of claim 1 wherein the filter comprises two parallel branches having opposed ends, including a first end connected to the charge pump and a second end connected to ground.

5. The apparatus of claim 1 wherein the charge pump comprises an inverter arrangement of MOS transistors, with a pair of bias transistors connected to the inverter arrangement.

6. The apparatus of claim 4 wherein a first branch of the filter comprises a capacitor.

7. The apparatus of claim 4 wherein a second branch of the filter comprises a capacitor and a resistor.

8. A regulation loop for a switching power converter of the type having a pulse width variable or pulse frequency variable modulator operating switches associated with a power source and a bridge filter section, with a power output node feeding a load, the variable parameter of the modulator establishing an amount of regulation and efficiency of the power converter, the bridge filter section having a first transfer function with inherent poles and zeros, the improvement comprising
   a comparator having a high impedance first input sampling a voltage or current from the power output node of the switching power converter as a first input signal and having a second input signal from a reference supply representing a target voltage or current level, the comparator having an output signal on an output line with a high or low signal depending on whether first input signal exceeds the second input signal or not;
   a filter connected to the comparator for receiving the comparator output signal and for delivering a filter output signal, the filter having a second order transfer function, the second order transfer function established by a selection of filter components offsetting the poles and zeros of the first transfer function, whereby the filter output signal is smooth, operating the variable input parameter of the pulse width variable or pulse frequency variable modulator; and
   a charge pump interposed between the comparator and the filter.

9. The apparatus of claim 8 wherein the filter comprises at least one capacitor in communication with the charge pump, whereby the charge pump adds and subtracts charge from the capacitor.

10. The apparatus of claim 8 wherein the filter comprises at least two capacitors in communication with the charge pump, whereby the charge pump adds and subtracts charge from the capacitor.

11. The apparatus of claim 8 wherein the filter comprises two parallel branches having opposed ends, including a first end connected to the charge pump and a second end connected to ground.

12. The apparatus of claim 8 wherein a first branch of the filter comprises a capacitor.

13. The apparatus of claim 11 wherein a second branch of the filter comprises a capacitor and a resistor.

14. The apparatus of claim 8 wherein the charge pump comprises switch means for injecting and retracting current from the filter.

* * * * *